July 31, 1962 — E. L. BARCUS — 3,046,840
REMOTELY CONTROLLED REAR VIEW MIRROR

Filed Aug. 27, 1959 — 2 Sheets-Sheet 1

INVENTOR.
Edward L. Barcus
BY
G. E. McGlynn Jr.
ATTORNEY

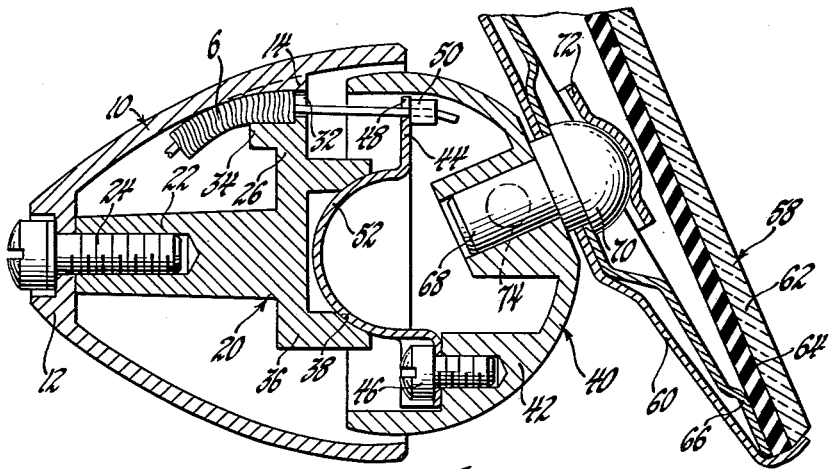

United States Patent Office 3,046,840
Patented July 31, 1962

3,046,840
REMOTELY CONTROLLED REAR VIEW MIRROR
Edward L. Barcus, Anderson, Ind., assignor to General Motors Corporation, Detroit, Mich., a corporation of Delaware
Filed Aug. 27, 1959, Ser. No. 836,502
3 Claims. (Cl. 88—93)

This invention pertains to a remotely controlled mirror mechanism of the type comprising a mirror assembly and an actuator assembly located remotely therefrom and adapted to be operated to selectively position the mirror assembly and, in particular, to such a mirror mechanism of the cable-operated type comprising improved means for mounting and adjusting the mirror assembly.

Prior known remotely controlled mirror mechanisms of the cable-operated type typically comprise a mirror assembly and mounting structure therefor supported in some convenient location exteriorly of an automotive vehicle, and adapted to be selectively positioned remotely by means of an actuator assembly located in a convenient position within the vehicle passenger compartment. Typically, the mirror mounting structure includes a mirror support head comprising a ball member completely confined and supported universally within a socket member. One or the other of the ball or socket members is secured to a mounting bracket or support while the other member is secured to the mirror assembly. In order to remotely position the mirror assembly, a plurality of flexible operating cables, usually three in number, have their opposite ends respectively directly connected to the mirror assembly and the remotely located actuator whereby universal manipulation of the latter will selectively position and retain in position the mirror assembly about the ball joint connection.

It is a principal object and feature of this inventon to provide a remotely controlled mirror mechanism of the type aforedescribed in which the mirror assembly is maintained in universally adjustable supported engagement with its mounting bracket exteriorly of the vehicle by means of a remotely located actuator assembly which is so constructed and arranged as to provide a means for imposing tension on the operating tables to maintain the components of the ball and socket mirror connection in bearing engagement with each other.

It is yet another object and feature of this invention to provide a remotely controlled mirror mechanism comprising a mirror structure mountable upon the exterior of a vehicle and including a mounting bracket and a mirror assembly, a ball and socket connection therebetween including an open socket member receiving a cooperating ball member, a plurality of operating cables directly connected to the mirror assembly and to a remotely located manually universally adjustable actuator member which may be operated to universally adjust the mirror assembly relative to the support bracket about the ball and socket connection, and means associated with the actuator for imposing tension on the operating cables within relatively great limits to provide a tension which is the sole means for maintaining the mirror-supporting ball member within its open socket.

In prior known cable-operated remotely controlled mirrors of the type aforedescribed, a problem of cable slack has been presented due to the fact that the distance between the mirror assembly and the remotely located actuator would vary from car to car. Consequently, due to slack in one or more of the operating cables, it has been difficult to adjust and, more importantly, to retain the mirror assembly in an adjusted position.

Accordingly, it is another object and feature of this invention to provide an improved actuator assembly for a remotely controlled mirror mechanism of the cable-operated type in which the actuator is freely adjustable to impose within relatively great limits a predetermined tension on the operating cables to remove slack therefrom.

Moreover, it is yet another object and feature of this invention to provide an improved actuator of the type aforementioned in combination with a mirror head structure comprising an open socket and a ball member cooperating therewith in which the actuator may be adjusted within relatively great limits to impose a predetermined tension on the operating cables to maintain the ball member of the mirror head in supported universally adjustable engagement with the open-ended socket while additionally removing slack from the operating cables.

In general, these and other objects are attained in a remotely controlled mirror mechanism comprising a mirror mounting bracket located exteriorly of an automotive vehicle and including an annular spherical bearing surface defining an open socket, a mirror support including a spherical bearing surface defining a ball member universally adjustably mounted within the aforementioned socket, and a plurality of flexible operating cables connected to the mirror support and, at their opposite ends, to a remotely located actuator which may be adjusted to impose tension on the cables to maintain the ball member within its open-ended socket while removing slack from the cables.

The nature of the mirror mechanism of this invention, and the manner in which the foregoing objects are attained, will become more apparent hereinafter as a description of the invention proceeds, and in which reference is made to the following drawings in which:

FIGURE 3 is a view taken on line 3—3 of FIGURE 2;

FIGURE 4 is a view taken on line 4—4 of FIGURE 2;

FIGURE 5 is a view taken on line 5—5 of FIGURE 2; and

FIGURE 6 is a longitudinal section through the actuator assembly.

Figure 1:
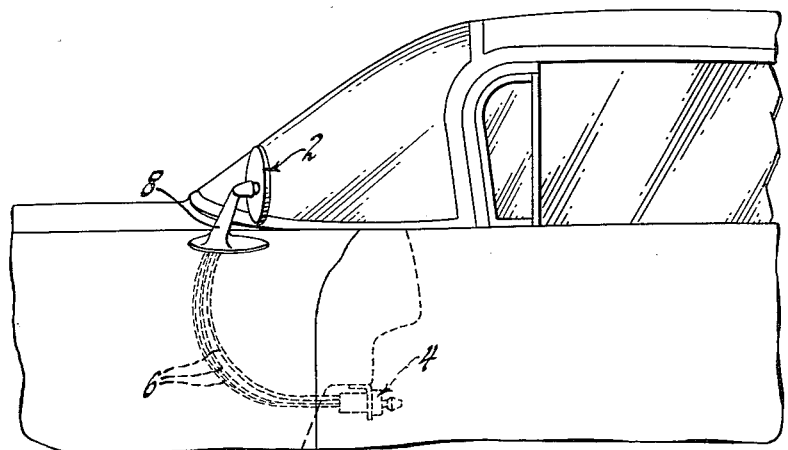
FIGURE 1 is a fragmentary side elevation of a vehicle equipped with a preferred embodiment of the invention.
Figure 2:
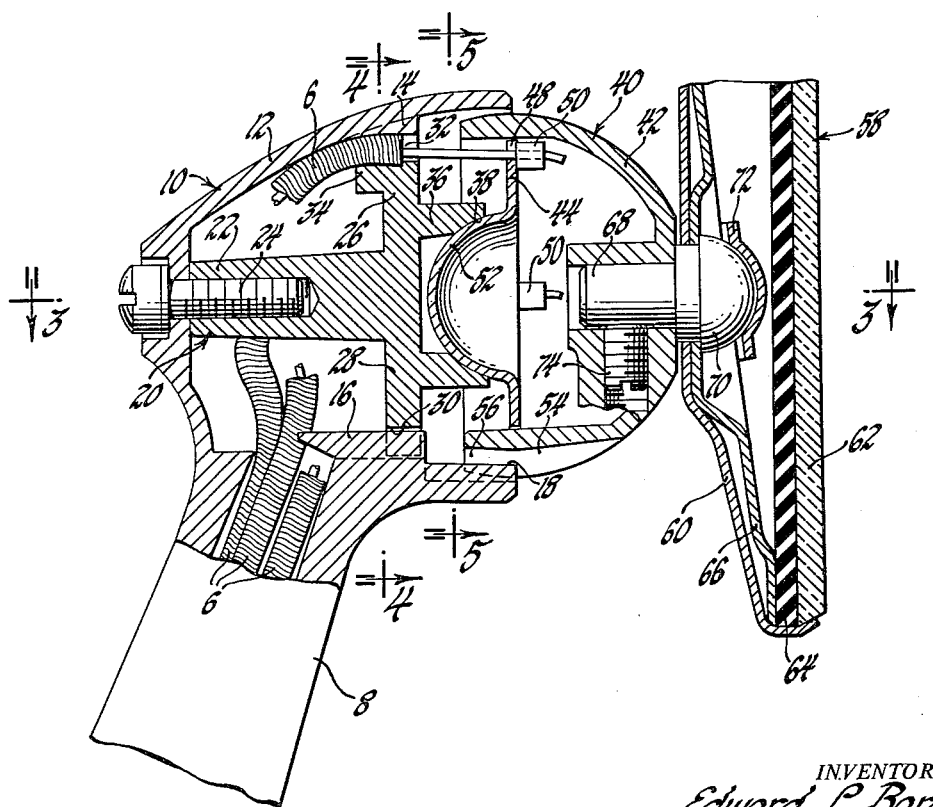
FIGURE 2 is an enlarged vertical section taken through the exterior mirror structure of FIGURE 1.

Referring now to the drawings, and particularly to FIGURE 1, there is shown an illustrative embodiment of the invention comprising a mirror structure 2 located on the left front fender of an automotive vehicle, and adapted to be remotely positioned by means of an actuator assembly 4 located on or below the vehicle instrument panel or dashboard within the passenger compartment. The actuator assembly and mirror structure are operatively interconnected by three flexible operating cables 6 of the Bowden wire type, and which cables are of conventional construction and comprise an inner flexible wire or cable member enclosed in suitable sheathing. At this juncture, it should be noted that the mirror structure 2 may be located in other positions exteriorly of the vehicle, such as on a door panel thereof, while the actuator assembly 4 may likewise be located in other positions within the vehicle passenger compartment suitably convenient to the vehicle operator.

Referring now to FIGURES 2 through 5 and the details of the mirror structure, the latter may be seen to comprise a mounting bracket 8 having a lower end suitably adapted to be fastened to the fender of the vehicle. If desired, the bracket 8 may be secured to the vehicle fender by means of a well known ball and socket mounting whereby the bracket itself may be adjustable relative to the fender. At the upper end of the bracket there is a mirror support head 10.

The mirror support head 10 may be seen to comprise an open-ended housing 12 formed integral with the bracket 8, and having radially inwardly projecting axially rearwardly tapering lands 14 spaced circumferentially about the interior surface of the housing and substantially equidistantly from each other. The lands 14 are substantially identical, while a radially inwardly directed locating rib 16 is associated with one of these lands as appears particularly in FIGURES 2 and 4. It will also be noted that another locating rib 18 is located forwardly of the rib 16 within the interior surface of the housing.

A cable support and adapter member 20 includes a centrally located axially rearwardly extending threaded boss 22 adapted to receive a threaded fastener 24 extending through the rear of the housing 12 and maintaining the adapter in position within the housing. The adapter further includes the three radially projecting arms, two of which as indicated at 26 being substantially identical while the arm 28 is wider than the other two arms and includes locating notch 30. At the outer end of each of these arms there is a radially opening slot 32 through a rearwardly extending boss 34 forming a seat for each of the sheathed cables, the bare cable wire being adapted to be slipped through the slots 32. With the adapter mounted in position within the housing 12, the adapter arms 26 and 28 nest radially inwardly of the housing lands 14, while the locating notch 30 is seated upon the rib 16 to properly orient the adapter relative to the housing. Moreover, the respective housing lands 14 thereby close the ends of the slotted arms 26 and 28 of the adapter to retain the cables therein. Additionally, the forward central portion of the adapter includes an annular wall 36 defining an open depression within the adapter, and which wall is formed with an annular spherical bearing surface 38 defining an open-ended socket.

A cable connector and mirror support member 40 comprises an outer member 42 of generally ball-shaped configuration to which the annular cable connector plate 44 is adapted to be suitably secured as by the fasteners 46. The periphery of the plate 44 at equidistantly spaced points thereon is radially slotted as at 48 to receive the bare wire of the flexible cables, the end of the cable wire being upset or otherwise deformed to retain thereon a connector block 50 resting against the forward peripheral face of the plate 44. A spherical ball member 52 is formed centrally of the plate 44, and is adapted to seat within the open-ended socket defined by the bearing surface 38 on the adapter 20. As will appear hereinafter, tension imposed upon each of the respective operating cables 6 continuously urges the ball member 52 into universally adjustable supported engagement with the open-ended socket aforedescribed. The outer ball member 42 includes a locating notch 54 which embraces rib 18 on the housing 12. The notch 54 is in the form of two truncated V's with the truncated apices thereof in end-to-end relationship to form outwardly converging walls 56 both rearwardly and forwardly of member 42.

The mirror assembly 58 is essentially of conventional construction in that it comprises a metal body member 60 having its peripheral edge crimped about the reflective mirror element 62. An annular gasket 64 is interposed between the rear surface of the mirror element and a retaining element 66. However, as compared to conventional mirror assemblies, the present assembly includes means for pivotally connecting a fixed point thereon eccentric with respect to the geometric axis of the mirror element 62 to the mirror support 40 for adjustment independently of operation of the cables 6.

To this end, the mirror body 60 and retainer 66 are supported on an annular shoulder of the pin 68 having an inner spherical head member 70 engaged by a socket plate 72 suitably secured to the interior of the mirror body 60. The pivotal connection of the mirror body 60 to the pin head 70 is at a point eccentrically located with respect to the geometric axis of the mirror element 62 whereby the latter may be universally adjusted about the fixed axis of the pin 68 to cause the mirror element 62 to be moved into different selected planes. The pivot pin 68 is non-rotatably secured within a suitable opening in the ball member 42 by means of a threaded fastener 74.

The actuator assembly 4 for adjustably positioning the mirror support 40 relative to the housing 12 and for imposing cable tension to take slack out of the cables and maintain the ball member 52 seated upon the socket 38 may be seen by referring to FIGURE 6. The actuator assembly comprises a substantially tubular housing 76 having a plurality of spaced longitudinally or axially extending slots 78 therein. One end of the housing is crimped to an externally threaded bushing 80 adapted to extend through a suitable aperture within a mounting panel 82. A tang 84 struck from the housing 76 cooperates with a notch or other locating means on the panel 82 to suitably orient the housing relative thereto. The internally threaded nut 86 is received upon the bushing 80 in abutment with the panel 82 to firmly secure the assembly to the panel. The opposite end of the housing 76 is crimped to an annular closure plate 88 having suitable recessed bosses 90 for receiving the sheathed cable, and a centrally located pin 92 projecting axially into the housing. The bare wire of each of the operating cables 6 is provided with fittings 94 adapted to be received within the manually operable actuator to be described.

The actuator or handle assembly consists of two parts, namely, an annular flange or wobble plate 96 joined to a central threaded shank 98, and the handling knob 100. The annular flange 96 fits within the housing 76 with slight clearance, the flange being provided with at least one radial locating projection 102 extending into one of the slots 78. Additionally, the periphery of the flange or plate 96 is slotted in a fashion generally similar to the various components of the mirror support head aforedescribed so as to permit slipping the cable fittings 94 thereinto for connection to the actuator. The set screw 104 is threadably received within the shank 98 and knob 100 of the handle assembly, and the end thereof is adapted to abuttingly engage the spherical end of the pin 92. The entire actuator or handle assembly comprising the wobble plate member 96 and knob 100 may be adjusted axially within the housing 76 within relatively great limits imposed by abutment of the projection or projections 102 with the ends of a given slot 78 by releasing the knob 100, which functions as a jam nut, adjusting the screw 104 against the rounded end of the pin 92, and then tightening the knob back against the shank 98 of the wobble plate.

As will be apparent from the preceding description with respect to the mirror support head 10, the various components thereof are adapted to be assembled in a predetermined relationship to properly orient the operating cables with respect to the adjustable mirror support 40. In similar fashion, the locating tang 84 on the actuator housing 76 properly orients the actuator relative to the mirror support head to insure that movement of the actuator handle in any given selected direction results in a corresponding movement for the mirror support 40. Additionally, it is again to be noted that in assembling the mechanism the knob 100 may be turned back slightly from the shank of the wobble plate, and set screw 104 threaded inwardly against the rounded end of the pin 92 to cause the annular wobble plate 96 to be reciprocated rearwardly within the housing within limits imposed by abutment of the projection 102 with the end of a given slot 78. By such action, tension is imposed on each of the cables 6 to take slack out of them, while additionally performing the important function of continuously urging the ball member 52 of the mirror support head into its cooperating socket. After this adjustment is made, the knob 100 is then turned down tightly against the shank of the wobble plate thereby acting as a jam nut to maintain the set screw 104 in a desired operative relationship with the pivot pin 92.

In operation, the actuator handle may be grasped and universally manually adjusted or wobbled about an axis which, in effect, is substantially at the center of curvature of the spherical end of the pin 92. The projection 102 of the actuator assembly properly orients the latter relative to the housing and prevents relative rotation therebetween about an axis through the pin 92. As the actuator assembly is operated, various cables or combinations thereof are pulled upon while others or combinations thereof are released to universally adjust the mirror support 40 about its socket. Once a selected mirror position is obtained, the operating handle of the actuator is left in this position and the mirror is retained in the selected position. If it is desired to make further and finer adjustment of the mirror position, the mirror body 60 may be grasped and manually rotated about the fixed axis of the pivot pin 68.

While but one form of the invention has been selected for a descriptive illustration thereof, other forms will be apparent to those skilled in the art. Therefore, the embodiment shown in the drawings is merely for illustrative purposes, and is not intended to limit the scope of the invention which is defined by the claims which follow.

I claim:

1. A remotely controlled mirror mechanism comprising a mounting bracket, a mirror assembly, a universal ball joint connection between said mounting bracket and mirror assembly, said universal ball joint connection comprising a first cable plate having a spherical ball member formed thereon and seated within a socket member, an actuator assembly located remotely from said mirror assembly and having a housing, a second cable plate mounted in the housing, a plurality of operating cables having the opposite end portions thereof directly connected at spaced points to the respective cable plates of said ball joint connection and said actuator, a set screw threaded into said second cable plate and having its axis centrally disposed with respect to the cable end portions, means in the housing coacting with said screw and maintaining the latter from movement along its axis relative to the housing so that rotation of the set screw serves to adjustably position the second cable plate relative to the screw to tension the cables.

2. A remotely controlled mirror mechanism comprising a mounting bracket, a mirror assembly, a universal ball joint connection between said mounting bracket and mirror assembly and comprising an open spherical socket receiving a spherical ball member, an actuator assembly comprising an axially extending housing, a wall member closing the base of said housing, a pin projecting from said wall member axially into the interior of said housing, an axial slot in the wall of said housing, an actuator in said housing and including a projection extending radially into said slot, a set screw threaded into said actuator and axially aligned with said pin for abutment with the end of the latter, and a plurality of operating cables having the opposite ends thereof respectively directly connected to spaced points on said mirror assembly and actuator, said set screw being adjustable relative to said actuator in abutment with said pin end to axially adjust said actuator within said housing to tension said cables, the tension of said cables forming the sole means maintaining said ball and socket members in engagement with each other.

3. A remotely controlled mirror mechanism comprising a mounting bracket, a mirror assembly, a universal ball joint connection between said mounting bracket and mirror assembly and comprising an open spherical socket receiving a spherical ball member, an actuator assembly comprising an axially extending housing, a wall member closing the base of said housing, a pin projecting from said wall member axially into the interior of said housing, an axial slot in the wall of said housing, a wobble plate in said housing and including a projection extending radially into said slot, a set screw threaded into said wobble plate and axially aligned with said pin for abutment with the end of the latter, a plurality of operating cables having the opposite ends thereof respectively directly connected to spaced points on said mirror assembly and wobble plate, said set screw being adjustable relative to said wobble plate in abutment with said pin end to axially adjust said wobble plate within said housing to tension said cables, the tension of said cables maintaining said ball member and socket in engagement with each other, and a handling knob threaded on the end of said screw and acting as a jam nut in abutment with said wobble plate.

References Cited in the file of this patent

UNITED STATES PATENTS 2,931,245    Jacobson _____ Apr. 5, 1960